United States Patent
Wensley

(10) Patent No.: US 6,881,515 B2
(45) Date of Patent: Apr. 19, 2005

(54) SEPARATOR FOR POLYMER BATTERY

(75) Inventor: C. Glen Wensley, Rock Hill, SC (US)

(73) Assignee: Celgard Inc., Charlotte, NC (US)

( * ) Notice: Subject to any disclaimer, the term of this patent is extended or adjusted under 35 U.S.C. 154(b) by 409 days.

(21) Appl. No.: 09/851,479

(22) Filed: May 8, 2001

(65) Prior Publication Data

US 2002/0168564 A1 Nov. 14, 2002

(51) Int. Cl.$^7$ ............................................... H01M 2/16
(52) U.S. Cl. ...................................... 429/145; 429/129
(58) Field of Search ................................. 429/129, 132, 429/134, 137, 141, 142, 144–145, 249, 247, 250, 131

(56) References Cited

U.S. PATENT DOCUMENTS

| | | | |
|---|---|---|---|
| 4,464,238 A | | 8/1984 | Caldwell et al. |
| 4,650,730 A | | 3/1987 | Lundquist et al. |
| 4,731,304 A | | 3/1988 | Lundquist et al. |
| 5,240,655 A | | 8/1993 | Troffkin et al. |
| 5,281,491 A | | 1/1994 | Rein et al. |
| 5,418,091 A | * | 5/1995 | Gozdz et al. ................ 429/252 |
| 5,460,904 A | | 10/1995 | Gozdz et al. |
| 5,518,838 A | | 5/1996 | Bai et al. |
| 5,565,281 A | | 10/1996 | Yu et al. |
| 5,604,660 A | | 2/1997 | Bai et al. |
| 5,631,103 A | | 5/1997 | Eschbach et al. |
| 5,639,573 A | | 6/1997 | Oliver et al. |
| 5,658,685 A | | 8/1997 | Oliver |
| 5,665,265 A | | 9/1997 | Gies et al. |
| 5,667,911 A | | 9/1997 | Yu et al. |
| 5,681,357 A | | 10/1997 | Eschbach et al. |
| 5,688,293 A | | 11/1997 | Oliver et al. |
| 5,691,047 A | * | 11/1997 | Kurauchi et al. ......... 428/315.7 |
| 5,716,421 A | * | 2/1998 | Pendalwar et al. ......... 29/623.2 |
| 5,750,284 A | | 5/1998 | Pendalwar et al. |
| 5,834,135 A | | 11/1998 | Pendalwar et al. |
| 5,837,015 A | | 11/1998 | Venugopal et al. |
| 5,849,433 A | | 12/1998 | Venugopal et al. |
| 5,853,916 A | | 12/1998 | Venugopal et al. |
| 5,894,656 A | * | 4/1999 | Menon et al. .............. 29/623.1 |
| 5,952,120 A | | 9/1999 | Yu et al. |
| 6,579,643 B1 | * | 6/2003 | Gozdz ......................... 429/145 |
| 6,586,138 B1 | * | 7/2003 | Pekala et al. ................ 429/249 |
| 2001/0004502 A1 | * | 6/2001 | Nakamizo et al. ............ 429/94 |

FOREIGN PATENT DOCUMENTS

| | | |
|---|---|---|
| GB | 2298817 | 9/1996 |
| JP | 98395/1994 | 5/1994 |
| JP | 7-56320 | 3/1995 |
| JP | 2642206 | 5/1997 |
| WO | WO 99/54953 | 10/1999 |
| WO | WO 01/57940 | 8/2001 |

OTHER PUBLICATIONS

Antoni S. Gozdz, Plastic Li–ion (PLiON) Rechargeable Cells with Bonded Microporous Separator, Apr. 2000.*
U.S. Appl. No. 09/016,024, filed Jan. 30, 1998, Spotnitz, et al.
A. Gozdz, et al, "Fabrication and Performance Characteristics of Plastic Li–Ion Batteries With Bonded Untreated Microporous Polyolefin Separators", 198th Meeting of the Electrochemical Society (Phoenix, AZ), (Oct. 22–27, 2000).
A. Gozdz, Plastic Li–ion (PLiON TM) Rechargeable Cells with Bonded Microprous Separator; Telcordia Report; Apr. 2000.

* cited by examiner

Primary Examiner—Michael Barr
Assistant Examiner—Monique Wills
(74) Attorney, Agent, or Firm—Robert H. Hammer, III, P.C.

(57) ABSTRACT

The instant invention is a separator for a lithium polymer battery. The separator comprises a membrane and a coating. The membrane has a first surface, a second surface, and a plurality of micropores extending from the first surface to the second surface. The coating covers the membrane, but does not fill the plurality of micropores. The coating comprises a gel-forming polymer and a plasticizer in a weight ratio of 1:0.5 to 1:3.

19 Claims, 1 Drawing Sheet

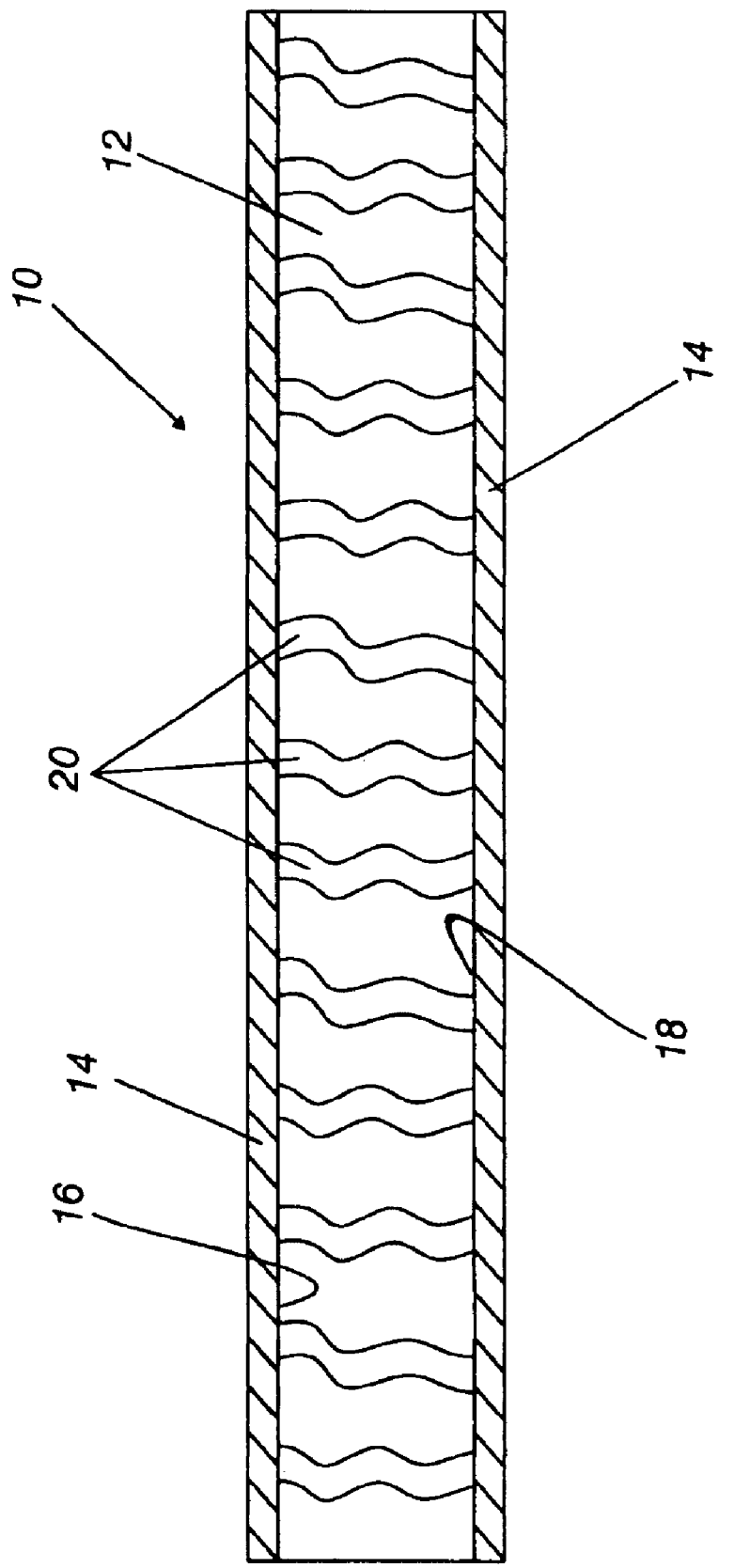

SEPARATOR FOR POLYMER BATTERY

FIELD OF THE INVENTION

The instant invention is directed to a separator for a polymer or gel electrolyte battery, for example, a lithium polymer battery.

BACKGROUND OF THE INVENTION

Batteries having gel polymer electrolytes or solid polymer electrolytes are known. See U.S. Pat. Nos. 5,418,091 & 5,460,904, and Linden, D., *Handbook of Batteries*, 2nd Edition, McGraw Hill, New York, N.Y. (1995), pgs. 36.37–36.42 et seq. It has been suggested that microporous membranes can be used in the assembly of polymer electrolyte batteries. See U.S. Pat. Nos. 5,518,838; 5,604,660; 5,631,103; 5,639,573; 5,681,357; 5,688,293; 5,750,284; 5,837,015; 5,853,916; 5,658,685; 5,849,433; 5,665,265; 5,716,421; Gozdz, A., "Plastic Li-Ion (PLiON™) Rechargeable Cells with Bonded Microporous Separator," Telecordia Report, April 2000; and Gozdz, A., et al., "Fabrication and Performance Characteristics of Plastic Li-Ion Batteries With Bonded Untreated Microporous Polyolefin Separators," 198$^{th}$ Meeting of the Electrochemical Society, Oct. 22–27, 2000. Separators, i.e., coated microporous membranes, designed specifically for use in such batteries are known. See U.S. patent application Ser. No. 09/016,024 filed Jan. 30, 1998, and WO 99/54953 claiming priority of Apr. 20, 1998.

WO 99/54953 discloses a composite electrolyte comprising a microporous membrane and a coating of an unplasticized, porous organic polymer containing a compound that has a dissociable lithium ion. The non-plasticized coating partially penetrates the pores of the membrane. The porous organic polymer may be polyvinylidene fluoride. In the examples, 15% of the pore volume was filled when the coating was polyethylene oxide (PEO), 35% of the pore volume was filled when the coating was polyvinylidene fluoride (PVDF); and 20% of the pore volume was filled when the coating was polytetrafluoroethylene (PTFE).

U.S. Pat. Nos. 5,518,838 and 5,604,660 disclose an electrolyte system comprising a solid polymer electrolyte impregnated into a porous separator.

U.S. Pat. No. 5,631,103 discloses an electrolyte system comprising a homogeneous mixture of an inert filler (for example, polymers or inorganic materials) and a gel-forming polymer, but no microporous membrane.

U.S. Pat. No. 5,639,573 discloses an electrolyte system comprising a microporous membrane and a gel-forming polymer, and the gel-forming polymer "extends at least partially into, and preferably through, the pores." Also see FIG. 2. Also see U.S. Pat. Nos. 5,681,357; 5,688,293; 5,750,284; 5,837,015; and 5,853,916; and U.S. application Ser. No. 09/016,024 filed Jan. 30, 1998.

U.S. Pat. Nos. 5,658,685 and 5,849,433 disclose an electrolyte system comprising a polymeric blend of a gel-forming polymer and an inert polymer, but no microporous membrane.

U.S. Pat. No. 5,665,265 discloses an electrolyte system comprising a nonwoven and a gelling polymer expanded between the fibers of the nonwoven.

U.S. Pat. Nos. 5,716,421 and 5,843,153 disclose an electrolyte system comprising a microporous membrane and a gelling polymer "wherein the gelling polymer and the electrolyte seeps or is forced into the pores."

There is a desire on the part of some battery manufacturers to move from liquid electrolytes to gel or solid electrolytes. One reason for this move is that cells made with gel or solid electrolytes may be moldable in to a variety of shapes. Another reason is to prevent the leakage of the electrolyte. This move, however, has been hindered by the fact that the conductivity of the gel or solid electrolyte is much less than that of the liquid electrolyte. To compensate for the lower conductivity of the gel and solid electrolytes, thinner electrolytes are required. Thinner electrolytes, however, are detrimental to the manufacture of the batteries because of their low mechanical strength. Accordingly, battery manufacturers have had to compromise. That compromise is the inclusion of a microporous membrane in the electrolyte. Inclusion of the microporous membrane has enabled the manufacture of these batteries. Gozdz, Ibid. At first, it was suggested that the gel-forming polymer should fill the pores of the membrane. See U.S. Pat. Nos. 5,639,573; 5,681,357; 5,688,293; 5,716,421; 5,750,284; 5,837,015; and 5,853,916. Later, it was suggested that the gel-forming polymer should partially fill the pores of the membrane. See PCT WO 99/54953.

Although, these separators perform well, there is still a need to continue to improve the conductivity of these coated separators for gel or polymer batteries.

SUMMARY OF THE INVENTION

The instant invention is a separator for a lithium polymer battery. The separator comprises a membrane and a coating. The membrane has a first surface, a second surface, and a plurality of micropores extending from the first surface to the second surface. The coating covers the membrane, but does not fill the plurality of micropores. The coating comprises a gel-forming polymer and a plasticizer in a weight ratio of 1:0.5 to 1:3.

DESCRIPTION OF THE DRAWING

For the purpose of illustrating the invention, there is shown in the drawing a form which is presently preferred; it being understood, however, that this invention is not limited to the precise arrangements and instrumentalities shown.

FIG. 1 is schematic illustration of the instant invention.

DESCRIPTION OF THE INVENTION

Referring to the FIGURE wherein like numerals indicate like elements, there are shown, in FIG. 1, a separator 10 for a polymer battery. Separator 10 comprises a microporous membrane 12 and a coating 14. The membrane 12 has a first surface 16, a second surface 18, and a plurality of micropores 20. The coating 14 is disposed on surfaces 16 and 18. Coating 14 covers the membrane 12, but does not fill the plurality of micropores 20. Separator 10, with a thickness less than 38 microns, preferably has a MacMullin Number (see U.S. Pat. No. 4,464,238, incorporated herein by reference) less than 20, and most preferably in the range of 4–12.

The coating 14 covers the membrane 12, but does not fill the micropores 20. The coating 14 covers the membrane 12, so that later, when the battery is activated by the addition of electrolyte, the pores 20 may be filled with the liquid electrolyte. The conductivity of the separator, in use in the activated cell, is, thus, improved over separators having filled pores by the inclusion within the unfilled pores 20 of liquid electrolyte. The coating, which covers the openings of the pores at the surfaces of the membrane, holds the electrolyte in the pores 20, but allows ion migration there through. The overall conductivity of the separator and electrolyte is improved when compared to separators having gel-filled pores, since the relatively thin coating of the gel-forming polymer provides only a small resistance to ion mobility. Additionally, by not filling the pores with the gel-forming polymer, the shutdown function of the separator is not inhibited, i.e., pores closure is not prevented by gel-forming polymer in the pores.

Covering refers to the coating 14 not substantially penetrating into, or filling, the pores 20. For example, the coating (i.e., PVDF:HFP) should not fill more than 30% of the pore volume, preferably, no more than 10% of the pore volume, and most preferred, 0% of the pore volume.

Membrane 12 refers to any micropores membrane. Membrane 12 may be a symmetric membrane or an asymmetric membrane. Membrane 12 may be made from a polyolefin. Exemplary polyolefins include, but are not limited to, polyethylene (PE), ultra high molecular weight polyethylene (UHMWPE), polypropylene (PP), polymethylpentene (PMP), copolymers of any of the foregoing, and mixtures thereof. Membrane 12 may be made by either a dry stretch process (also know as the CELGARD® process) or a solvent process (also known as the gel extrusion or phase separation process). Membrane 12 may have the following characteristics: an air permeability (Gurley) of no more than 300 sec/100 cc (preferably 200 sec/100 cc, most preferably 150 sec/100 cc); a thickness ranging from 5 to 500 microns ($\mu$) (preferably 10 to 100 microns, most preferably 10 to 50 microns); pore diameters ranging from 0.01 to 10 microns ($\mu$) (preferably 0.02 to 5 microns, most preferably 0.02 to 0.5 microns); and a porosity ranging from 35 to 85% (preferably 40 to 80%). Membrane 12 may be a single layer membrane, a tri-layer membrane (e.g., PP/PE/PP or PE/PP/PE), or a multi-layer membrane. Membrane 12 is preferably a shutdown separator, for example see U.S. Pat. Nos. 4,650,730; 4,731,304; 5,281,491; 5,240,655; 5,565,281; 5,667,911; U.S. application Ser. No. 08/839,664 (filed Apr. 15, 1997); Japanese patent No. 2642206 and Japanese patent application Nos. 98395/1994 (filed May 12, 1994); 7/56320 (filed Mar. 15, 1995); and UK patent application No. 9604055.5 (Feb. 27, 1996), all of which are incorporated herein by reference. Membranes 12 are commercially available from: CELGARD Inc., Charlotte, N.C., USA; Asahi Chemical Industry Co.; LTD., Tokyo, Japan; Tonen Corporation, Tokyo, Japan; Ube Industries, Tokyo, Japan; and Nitto Denko K.K., Osaka, Japan.

The coating 14 comprises a gel-forming polymer and a plasticizer in a weight ratio of 1:0.5 to 1:3, most preferably, 1:2. The surface density of the coating is 0.4 to 0.9 mg/cm$^2$, and preferably 0.55 to 0.7 mg/cm$^2$.

The gel-forming polymer may be selected from, but is not limited to, polyvinylidene fluoride (PVDF); polyurethane; polyethylene oxide (PEO); polyacrylonitrile (PAN); polymethylacrylate; polyacrylamide; polyvinylacetate; polyvinylpyrrolidone; polytetraethylene glycol diacrylate; copolymers of any the foregoing and combinations thereof. One criterion for comonomer selection is the comonomer's ability to modify the surface energy of the homopolymer. Surface energy impacts, at least: the solubility of the copolymer, thereby affecting coating the copolymer onto the membrane; the adhesion of the copolymer to the membrane, thereby affecting battery manufacture and subsequent performance; and the wettability of the coating, thereby affecting absorption of liquid electrolyte into the separator. Suitable comonomers include, but are not limited to, hexafluoropropylene, octofluoro-1-butene, octofluoroisobutene, and tetrafluoroethylene. The comonomer content preferably ranges from 3 to 20% by weight, and most preferably, 7 to 15%. Preferably, the gel-forming polymer is a copolymer of polyvinylidene fluoride. Preferably, the PVDF copolymer is a copolymer of polyvinylidene fluoride and hexafluoropropylene (PVDF:HFP), and, most preferably, the PVDF:HFP ratio is 91:9. The PVDF copolymers are commercially available from Elf Atochem, Philadelphia, Pa., USA; Solvay SA, Brussels, Belgium; and Kureha Chemical Industries, LTD, Ibaraki, Japan. A preferred PVDF:HFP copolymer is KYNAR 2800 from Elf Atochem.

Plasticizer is selected from materials that are compatible with (i.e., miscible with or will not phase separate from) the gel-forming polymer, that, in trace amounts (e.g., 10–20% of the original coating amount), will not have a detrimental effect upon the battery chemistry (such as plasticizer that contain sulphones, sulphates, and nitrogen), and that are fluid at room temperature or have a Tg (glass transition temperature) <50° C. The plasticizer may be selected from, but is not limited to, phthalate-based esters, cyclic carbonates, polymeric carbonates, and mixtures thereof. Phthalate-based esters are selected from, but are not limited to, dibutyl phthalate. Cyclic carbonates are selected from ethylene carbonate (EC), propylene carbonate (PC), butylene carbonate (BC), and mixtures thereof. Polymeric carbonates are selected from, but are not limited to, polyvinylene carbonate, and linear propylene carbonates.

In the manufacture of the coated separator, the membrane is coated with a solution of gel forming polymer, plasticizer, and solvent. Coating may be accomplished by any technique, but dip coating is preferred. The solvents include, but are not limited to, methyl ethyl ketone (MEK), acetone, N-methyl pyrrolidone (NMP), tetrahydrofuran (THF), dimethylformamide and combinations thereof. To coat the membrane, so that coating covers the membrane, requires consideration of several factors. The gel-forming polymer should have a molecular weight as high as possible, and a Kuhn length as high as possible. It is believed that the combination of high molecular weight and Kuhn length (a measure of polymer stiffness) creates "balls" of dissolved polymer. The membrane should have a pore diameter as small as possible. The solution concentration should be greater than or equal to 1% by weight, preferably in the range of 1 to 5%, and most preferred in the range of 2 to 4%. It is believed that at these concentrations that the "balls" of polymer 'entangle' so that they cannot physically enter the pore.

The present invention may be embodied in other specific forms without departing from the spirit or essential attributes thereof, and, accordingly, reference should be made to the appended claims, rather than to the foregoing specification, as indicating the scope of the invention.

That which is claimed:

1. A separator for a lithium polymer battery comprising:
    a membrane having a first surface, a second surface, and a plurality of micropores extending from the first surface to the second surface;
    a coating, the coating covering the membrane, but not filling the plurality of micropores, the coating comprising a gel-forming polymer and a plasticizer in a weight ratio of 1:0.5 to 1:3, and having a surface density of 0.4 to 0.9 mg/cm$^2$.

2. The separator of claim 1 wherein the coating covers the first surface and the second surface.

3. The separator of claim 1 wherein the gel-forming polymer is a copolymer of polyvinylidene fluoride.

4. The separator of claim 3 wherein the comonomer content of the polyvinylidene fluoride copolymer comprises about 3–20% by weight.

5. The separator of claim 4 wherein the comonomer content comprises about 7 to 15% by weight.

6. The separator of claim 4 wherein the comonomer is selected from the group consisting of hexafluoropropylene, octofluoro-1-butene, octofluoroisobutene, tetrafluoroethylene, and mixtures thereof.

7. The separator of claim 6 wherein the copolymer of polyvinylidene fluoride is polyvinylidene fluoride:hexafluoropropylene in which the hexafluoropropylene comprises about 9% by weight.

8. The separator of claim 1 wherein the ratio is 1:2.

9. The separator of claim 1 wherein the coating has a surface density of 0.55 to 0.7 mg/cm$^2$.

10. The separator of claim 1 wherein the plasticizer is selected from the group of phthalate-based esters, cyclic carbonates, polymeric carbonates, and mixtures thereof.

11. The separator of claim 10 wherein the phthalate based esters includes dibutyl phthalate.

12. The separator of claim 10 wherein the cyclic carbonates are selected from the group consisting of ethylene carbonate, propylene carbonate, butylene carbonate, and mixtures thereof.

13. The separator of claim 1 wherein the membrane is a single layer microporous membrane.

14. The separator of claim 1 wherein the membrane is a multi-layered microporous membrane.

15. The separator of claim 14 wherein the membrane is a tri-layer separator having a polypropylene/polyethylene/polypropylene structure.

16. The separator of claim 1 wherein the membrane is shutdown membrane.

17. The separator of claim 1 wherein the membrane contains an ultra high molecular weight polyethylene.

18. A method of making a separator for a lithium polymer battery comprising the steps of:

providing a microporous membrane having a plurality of micropores;

providing a solution, the solution comprising a gel-forming polymer, a plasticizer, and a solvent, the solution concentration being >1% by weight;

coating the solution onto the membrane to have a surface density of 0.4 to 0.9 mg/cm$^2$;

driving off the solvent of the solution; and forming thereby a coating covering the membrane, but not filling the plurality of micropores.

19. The method of claim 18 wherein the solution concentration ranges from about 2 to 4% by weight.

* * * * *